United States Patent [19]

Rodemeyer

[11] 3,998,187
[45] Dec. 21, 1976

[54] ANIMAL ACTIVITY APPARATUS

[75] Inventor: Donald James Rodemeyer, City Island, N.Y.

[73] Assignee: Metaframe Corporation, Elmwood Park, N.J.

[22] Filed: Oct. 9, 1975

[21] Appl. No.: 621,107

[52] U.S. Cl. .................................................. 119/29
[51] Int. Cl.² ........................................ A01K 29/00
[58] Field of Search .................... 119/29, 17, 15

[56] References Cited
UNITED STATES PATENTS

| | | | |
|---|---|---|---|
| 3,742,908 | 7/1973 | Merino | 119/15 |
| 3,785,347 | 1/1974 | Dinnerstein | 119/29 |
| 3,933,126 | 1/1976 | Gordon | 119/29 |

Primary Examiner—Hugh R. Chamblee
Attorney, Agent, or Firm—Max E. Shirk; Stephen L. King; Robert Mulcahy

[57] ABSTRACT

Revolvable, hollow spheroid has a pair of tubes communicating with its interior 180° apart. The free ends of the tubes may be closed with caps to prevent the animal from escaping. A housing mount rotatably mounts the spheroid and serves as an access opening for an animal of the rodent type. The animal may rotate the spheroid by running on its inner surface or by entering one of the tubes. The housing mount includes a fitting for connecting the spheroid to a tube communicating with an animal cage.

1 Claim, 6 Drawing Figures

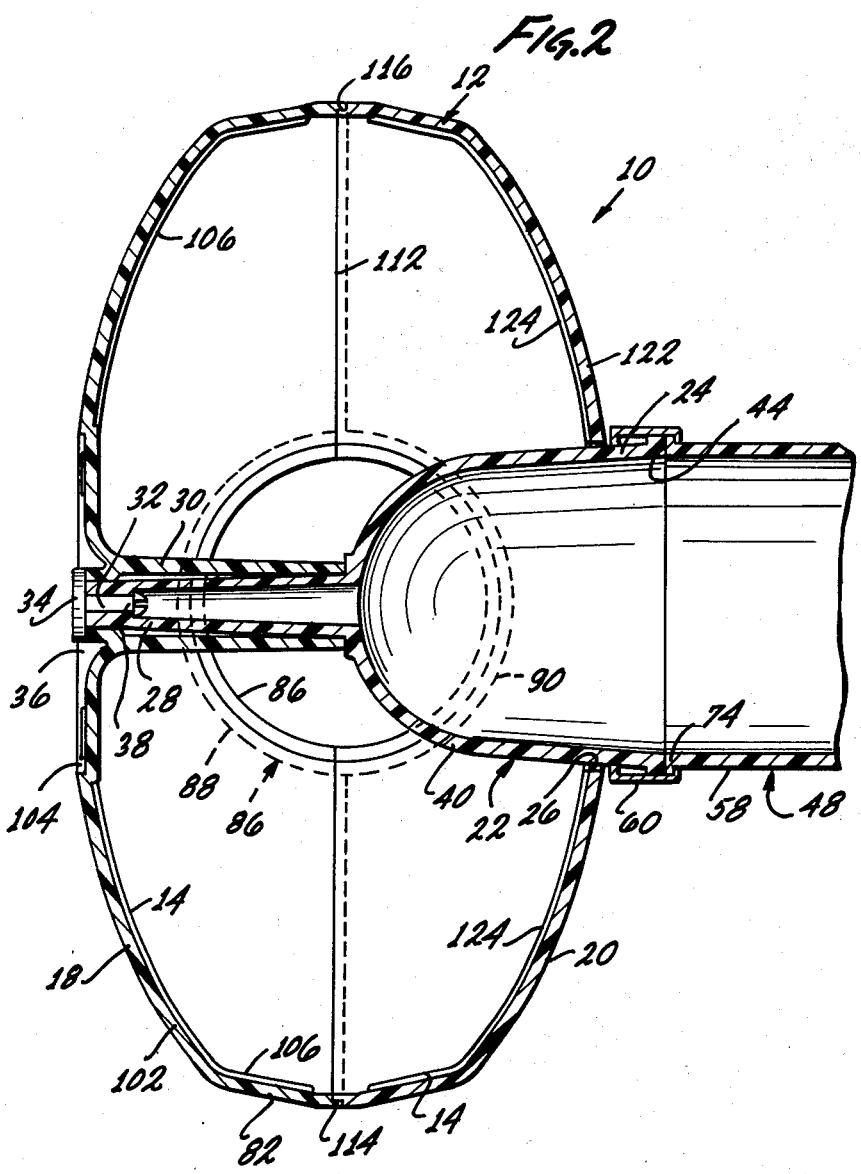
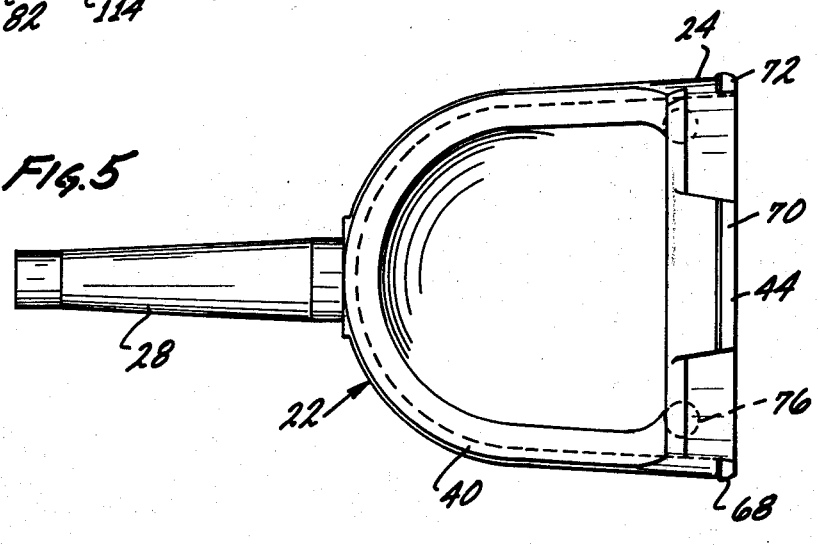

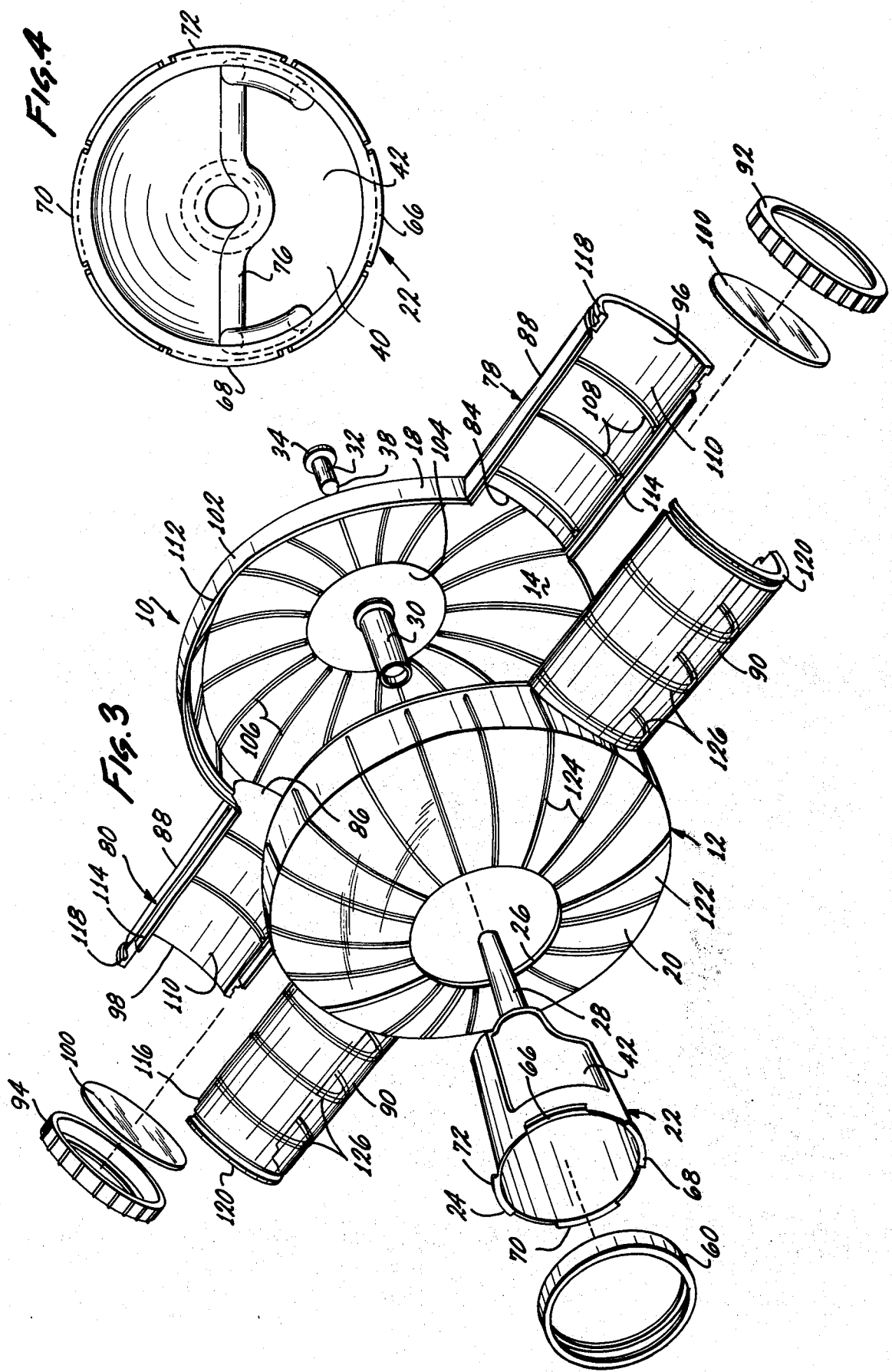

3,998,187

ANIMAL ACTIVITY APPARATUS

BACKGROUND OF THE INVENTION

The background of the invention will be set forth in two parts.

1. Field of the Invention

The present invention pertains generally to animal activity apparatus and more particularly to a new and useful revolvable spheroid which may be mounted exteriorly of an animal cage in communication therewith so that an animal in the cage may move freely from the cage to the revolvable spheroid and back again to the cage.

2. Description of the Prior Art

The prior art known to applicant is listed by way of illustration, but not of limitation, in separate communications to the United States Patent Office.

The present invention exemplifies improvements over this prior art.

SUMMARY OF THE INVENTION

According to the present invention, a new and useful animal activity apparatus is provided.

This apparatus includes a revolvable spheroid having an inner surface along which an animal is freely movable, a stationary member rotatably mounting the spheroid and including an access opening for the animal and means for affixing the mounting means to an outer surface of an animal cage with the access opening in the stationary member communicating with the inside of the cage.

The revolvable spheroid may be provided with a pair of hollow members located on its outer surface approximately 180° apart. The hollow members communicate with the inner surface of the spheroid so that the animal may run along the inner surface and then enter the hollow members.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 2 is an enlarged, partial cross-sectional view taken along line 2—2 of FIG. 1;

FIG. 3 is an enlarged exploded perspective view of the revolvable portion of the apparatus shown in FIG. 1;

FIG. 4 is a top plan view of the stationary mounting member shown in FIG. 1 for connecting the front and rear halves of the revolvable portion of the apparatus shown in FIG. 1 together;

FIG. 5 is a front elevational view of the stationary mounting member shown in FIG. 4.

DESCRIPTION OF THE PREFERRED EMBODIMENT

Figure 1:
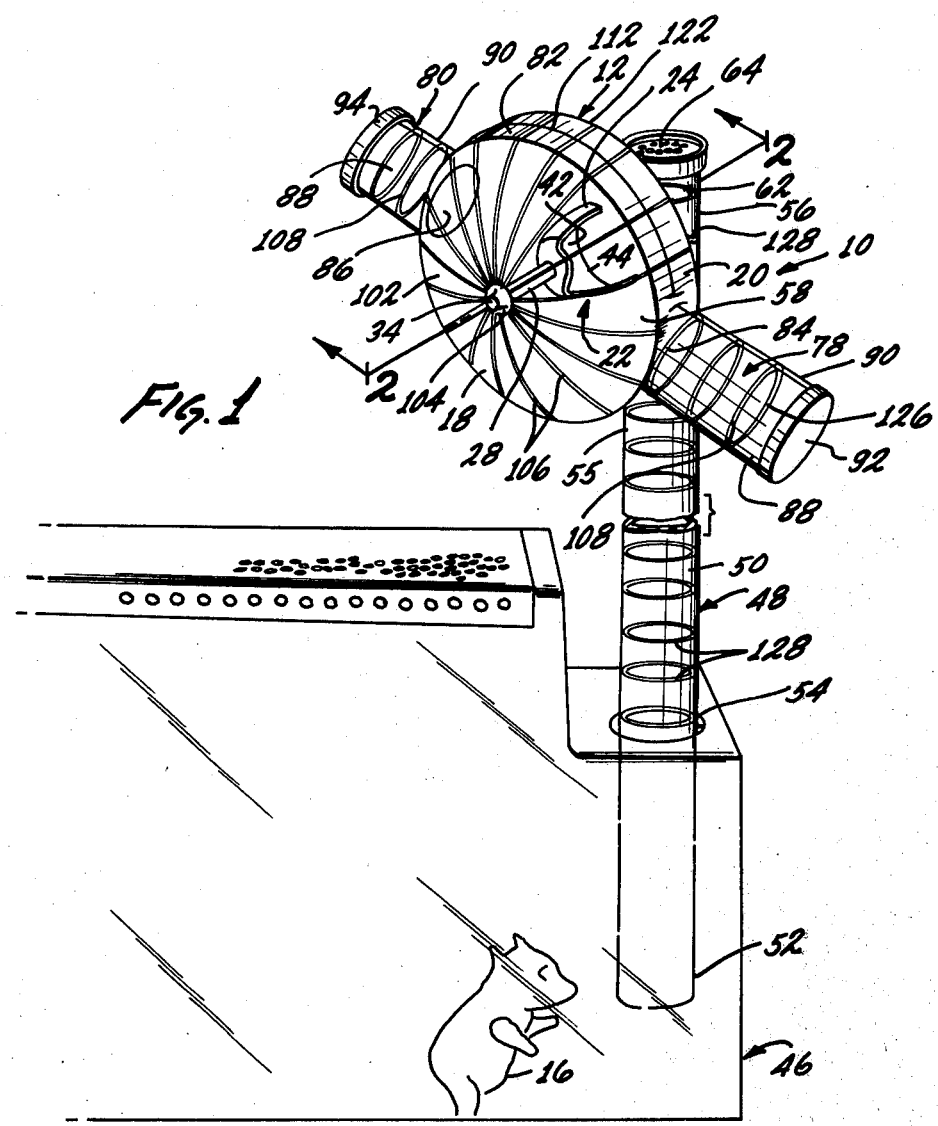
FIG. 1 is a perspective view of an animal activity apparatus constituting a presently preferred embodiment of the invention.
Figure 6:
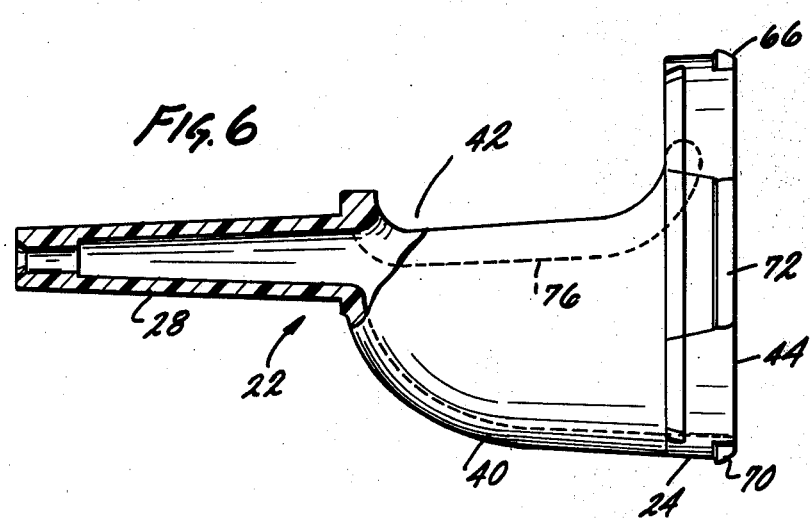
FIG. 6 is a side elevational view, with parts broken away to show internal construction, of the stationary mounting member shown in FIG. 4.

Referring again to the drawings, and more particularly to FIGS. 1, 2 and 3, an animal activity apparatus constituting a presently-preferred embodiment of the invention, generally designated 10, includes a revolvable spheroid 12 having an inner surface 14 along which an animal 16 is freely movable. Spheroid 12 includes a front housing half 18 and a rear housing half 20 rotatably mounted on a stationary mounting member 22 having an end 24 mounted in an opening 26 provided in housing half 20 and a shaft 28 rotatably receiving a cylindrical hub 30 extending inwardly from housing half 18. Housing half 18 is coupled to shaft 28 by an axle pin 32 having a head 34 seated in a cavity 36, which is provided in housing half 18, and a shank 38, which frictionally engages shaft 28.

Referring now to FIGS. 1–6, the stationary mounting member 22 includes a cup-like member 40 having a first opening 42 provided in its side and a second opening 44 provided in end 24. Openings, 42, 44 comprise access openings for animal 16 and may be placed in communication with an animal cage 46 (FIG. 1) by a tubular assembly 48 including a first tube 50 having a lower end 52 extending through an opening 54 in cage 46 and an upper end 55 connected to a T-shaped tube 56 having a branch 58 (FIG. 2) connected to end 24 of member 22 by a coupler 60. Tube 56 includes an upper end 62 (FIG. 1) which is fitted with a perforated cap 64 for confining animal 16 while providing ventilation for spheroid 12 and tubular assembly 48. Coupler 60 is connected to four flanges 66, 68, 70 and 72 provided on end 24 of member 22 and is permanently retained in position on branch 58 of tube 56 by an annular shoulder 74 (FIG. 2). Cup-like member 40 is preferably reinforced by a reinforcing bail 76 which may be formed integrally with shaft 28, dup-like member 40 and flanges 66, 68, 70 and 72 when member 22 is molded from a suitable polymeric material which is preferably transparent. Additionally, cage 46, tube assembly 48 and the remaining components of spheroid 12 may be molded from suitable transparent polymeric materials so that an observer may watch animal 16 as it moves about in the animal activity apparatus of the present invention.

Referring now to FIGS. 1–3, spheroid 12 may be provided with a pair of hollow members 78, 80 located on its outer surface 82 approximately 180° apart in communication with inner surface 14 through openings 84, 86, respectively, provided in surface 82. The members 78, 80 each includes a first semi-cylindrical portion 88 formed integrally with front housing half 18 and a second semi-cylindrical portion 90 formed integrally with the rear housing half 20. These semi-cylindrical portions and housing halves 18, 20 may be held together by a pair of end caps 92, 94 fitted on the open ends 96, 98 of members 78, 80, respectively. The end caps 92, 94 may each be made from a suitable polymeric material and each cap is fitted with a metal plate 100 (FIG. 3) on its inner surface to prevent animal 16 from chewing the end caps. It will be apparent to those skilled in the art that end caps 92, 94 may be removed so that members 78, 80 may be connected to tubes leading to other animal cages or the like. In this event, spheroid 12 will, of course, remain stationary.

Front housing half 18 includes a hemispherical portion 102 having a slightly recessed dome portion 104 providing an annular surface for raised, printed advertising matter (not shown). The inner surface 14 of hemispherical portion 102 may be provided with a plurality of equally-spaced, radially-extending ribs 106 providing treads for animal 16 as it moves freely along surface 14. Additionally, arcuate ribs 108 may be provided on the inner surface 110 of each semi-cylindrical member 88 to assist animal 16 is climbing upwardly out of one of the members 78, 80 when such member has been moved to a downwardly-extending position by the weight of animal 16.

Front housing half 18 also includes a peripheral edge 112 extending around hemispherical portion 102 and along each semi-cylindrical member 88. This edge is provided with a tongue-and-groove type of seal 114 (FIG. 3) adapted to sealingly engage a similar seal 116 provided on rear housing half 20. Additionally, each semi-cylindrical portion 88 of front housing half 18 is provided with a semi-annular shoulder 118 each of which mates with a similar shoulder 120 on rear housing half 20 for forming an annular shoulder sealingly engaged by an associated one of the end caps 92, 94 so that the end caps and seals 114, 116 will prevent animal urine from escaping from spheroid 12.

Rear housing half 20 also includes a hemispherical portion 122 from which the semi-cylindrical members 90 extend. The inner surface 14 of hemispherical portion 122 is provided with a plurality of equally-spaced, radially-extending ribs 124 encompassing opening 26 and mating with ribs 106 when housing halves 18, 20 are brought together. Additionally, semi-cylindrical members 90 are provided with arcuate ribs 126 which will form a continuation of ribs 108 when housing halves 18, 20 are assembled.

It will be understood by those skilled in the art that tube assembly 48 may also be provided with annular ribs 128 (FIG. 1) to assist animal 16 in climbing up tube assembly 48.

Operation of the animal activity apparatus 10 will now be described in connection with FIGS. 1 and 2. Animal 16 may leave cage 46 by entering end 52 of tube 50 and climbing up tube assembly 48 to access openings 44, 42 through which animal 16 may enter spheroid 12.

As animal 16 freely moves along inner surface 14 of spheroid 12 with its feet engaging ribs 106, 124, spheroid 12 will rotate. If animal 16 then enters one of the hollow members 78, 80, the weight of animal 16 will cause spheroid 12 to become unbalanced with respect to its center of rotation, as defined by shaft 28 and hub 30, so that spheroid 12 will oscillate back-and-forth with the members 78, 80 which contains animal 16 lowermost. Alternatively, animal 16 may leave the lowermost members 78, 80 before spheroid 12 oscillates to any degree and either continue moving along inner surface 14 or enter the other members 78, 80 causing them to seek the bottom of the arc circumscribed by spheroid 12 when it rotates.

While the particular animal activity apparatus herein shown and described in detail is fully capable of attaining the objects and providing the advantages hereinbefore stated, it is to be understood that it is merely illustrave of the presently preferred embodiment of the invention and that no limitations are intended to the details of construction or design herein shown other than as defined in the appended claims, which form a part of this disclosure.

Whenever the term "member" is employed in the claim, this term is to be interpreted as defining the corresponding structure illustrated and described in this specification or the equivalent of the same.

What is claimed is:

1. An animal activity apparatus, comprising:
   a revolvable spheroid having an inner surface along which an animal is freely movable, said spheroid having a predetermined axis-of-rotation and being provided with an opening concentric with said axis-of-rotation, said spheroid also including a pair of hollow members mounted on the outer surface of said spheroid in communication with the inner surface of said spheroid, whereby said animal may run along said inner surface and enter said hollow members, said hollow members each having a major axis normal to said axis-of-rotation, said hollow members extending from said spheroid in locations which lie approximately 180° apart;
   a stationary member rotatably mounting said spheroid, said stationary member including a shaft rotatably engaging said spheroid and a cup-like member mounted in said opening in said spheroid, said cup-like member having an access opening provided therein in communication with said opening in said spheroid, whereby said animal may enter and leave said spheroid;
   a tubular member connected to said stationary member in communication with said access opening in said cup-like member; and
   an animal cage connected to said tubular member for placing said cage in communication with said access opening in said cup-like member, whereby said animal may leave said cage, travel through said tubular member and enter said spheroid.

* * * * *